United States Patent [19]

Fujita

[11] 4,237,206
[45] Dec. 2, 1980

[54] PHOTOGRAPHIC PAPER BASE WITH SEPERATE REFLECTIVE LAYER

[75] Inventor: Yoshihiro Fujita, Tokyo, Japan

[73] Assignee: Fuji Photo Film Co., Ltd., Minami-ashigara, Japan

[21] Appl. No.: 971,444

[22] Filed: Dec. 20, 1978

[30] Foreign Application Priority Data

Dec. 21, 1977 [JP] Japan ................. 52-154227

[51] Int. Cl.$^3$ .............................................. G03C 1/86
[52] U.S. Cl. ...................................... 430/11; 430/18; 430/538; 430/950
[58] Field of Search ............... 96/85; 430/11, 18, 538, 430/950

[56] References Cited

U.S. PATENT DOCUMENTS

| | | | |
|---|---|---|---|
| 2,595,670 | 5/1952 | Goehner | 96/39 |
| 2,755,150 | 7/1956 | Griggs et al. | 96/85 |
| 2,875,054 | 2/1959 | Griggs et al. | 96/85 |
| 3,021,214 | 2/1962 | Murphy et al. | 96/85 |
| 3,096,231 | 7/1963 | Griggs et al. | 96/85 |
| 3,615,552 | 10/1971 | Danhauser et al. | 96/85 |
| 3,864,132 | 2/1975 | Rasch et al. | 96/85 |
| 4,054,453 | 10/1977 | Grobin | 96/67 |
| 4,097,282 | 6/1978 | Noonan et al. | 96/85 |

*Primary Examiner*—Jack P. Brammer

[57] ABSTRACT

In a photographic paper to be attached to the surface of a desired object, a white adhesive layer, a resin layer containing a light reflective material and an emulsion layer on which an image is to formed are laminated, in this order. The photographic paper can be produced by laminating a resin layer containing a light reflective material on a support base so that the peeling strength between the support base and the resin layer is within a range of 10 to 200 gW, and then laminating an emulsion layer on the resin layer. An image is printed on the emulsion layer, and the support base is removed from the resin layer. Then, a white adhesive layer is provided on the exposed surface of the resin layer.

3 Claims, 3 Drawing Figures

PHOTOGRAPHIC PAPER BASE WITH SEPERATE REFLECTIVE LAYER

BACKGROUND OF THE INVENTION

1. Field of the Invention

This invention relates to a photographic paper, more particularly to a photographic paper which can be attached to the surface of a desired object and a process for producing the same.

2. Description of the Prior Art

Generally a photographic paper is composed of a support base, a resin (polymer) layer containing a light reflective material and an emulsion layer laminated in this order, or is composed of a support base, a resin layer containing a light reflective material, a primer layer and an emulsion layer laminated in this order. A color image or a black-and-white image is formed on the emulsion layer by printing the image on the photographic paper. The image formed on the emulsion layer is sharply defined by the light which is reflected by the light reflective material, for example titanium dioxide ($TiO_2$), contained in the resin layer and by the support base.

The support base is generally formed of a paper of substantial thickness so as to protect the photographic paper from being broken or folded. Accordingly, when the photographic paper on which an image has been formed is attached to the surface of an object such as a notebook the total thickness of the object becomes undesirably large. Further, since the support base is liable to curl, it is rather difficult to bring the whole area of the surface thereof into sufficient contact with the surface to which the photographic paper is to be attached. In the conventional photographic papers, the resin layer is firmly adhered to the support base so that the photographic paper will not be easily damaged in handling or storage and, accordingly, if the support base should be forcibly removed from the photographic paper, the resin layer and the emulsion layer would be damaged and, accordingly, the image formed on the emulsion layer would also be damaged.

It has previously been found that the adhesion strength, that is, the peeling strength between the resin layer and the support base can be adjusted by controlling the temperature of the polymer at the time the polymer is cast on the support base to form the resin layer and, accordingly, that a photographic paper having a support base which can easily be peeled off from a resin layer after an image is formed on the emulsion layer can be obtained without providing a release agent layer between the support base and the resin layer. Japanese Patent Application No. 41078/1977 discloses such a photographic paper, that is a photographic paper having a support base which can easily be peeled off from a resin layer, and which comprises a support base, a resin layer containing a light reflective material and an emulsion layer laminated in this order. In the photographic paper disclosed in Japanese Patent Application No. 41078/1977, the support base is peeled off from the resin layer after an image is formed on the emulsion layer. After the support base is removed, the resulting thin resin-emulsion composite can conveniently be attached to the surface of a desired object. Also, the photographic paper disclosed in the aforesaid patent application is simple in structure in comparison with a photographic paper having a release agent layer provided between a support base and a resin layer and, accordingly, can be manufactured at a low cost. In this photographic paper, after the support base is removed, an adhesive layer is formed on the lower surface of the resin layer to attach the resin-emulsion composite to the surface of a desired object.

However, the aforesaid photographic paper to be attach to the surface of a desired object which cmprises the resin-emulsion composite and the adhesive layer provided on the lower surface of the resin layer has a defect in that the quality of the image displayed thereby is inferior to that displayed by the conventional photographic paper having a support base. The defect is caused by the fact that the photographic paper does not have a support base. That is, in a photographic paper, it is the function of the support base not only to support the resin layer and the emulsion layer but also to work together with a resin layer containing a light reflective material to enhance the vividness of the image displayed. For this reason, white paper having good reflectance is employed in the conventional photographic paper as a support base. Naturally, the deterioration of image quality caused by attaching the aforesaid photographic paper having no support base to the surface of an object can be minimized by proper selection of the object to which the photographic paper is attached. However, this greatly narrows the range of practical application of the photographic paper.

SUMMARY OF THE INVENTION

Thus, the object of the present invention is to provide a photographic paper for attachment to the surface of a desired object which has no support base but which displays an image of very good quality.

Another object of the present invention is to provide a process for producing such a photographic paper.

The inventor of the present invention conducted various investigations on photographic papers and found that the above-mentioned objects can be accomplished by whitening the adhesive layer provided on the lower surface of the resin layer after the support base is removed from the resin layer of the photographic paper.

The photographic paper designed for attachment to the surface of a desired object of the present invention is characterized in that a white adhesive layer, a resin layer containing a light reflective material and an emulsion layer on which an image has been formed are laminated in this order. A primer layer can optionally be provided between the resin layer and the emulsion layer.

The process for producing the photographic paper of the present invention comprises the following four steps:

(a) manufacturing an unexposed photographic paper by laminating a resin layer containing a light reflective material on a support base so that the peeling strength between the support base and the resin layer is set within a range of 10 to 200 gW, and then laminating an emulsion layer, or a primer layer and an emulsion layer in this order, on the resin layer, (b) forming an image on the emulsion layer by printing an image on the unexposed photographic paper and developing the printed image, (c) removing the support base from the unexposed photographic paper, and (d) applying a white adhesive layer on the lower surface of the resin layer.

DESCRIPTION OF THE PREFERRED EMBODIMENTS

Figure 1:
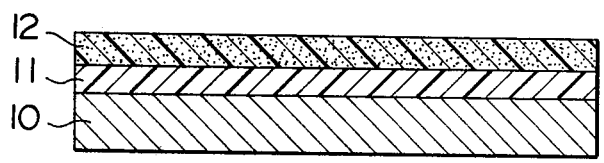
FIG. 1 is a cross-sectional view of a photographic paper in which the support base can be removed from the resin layer.

Referring to the drawings, the present invention will hereinafter be described in detail.

As shown in FIG. 1, a resin layer 11 which is formed of, for example, polyethylene polymer containing a light reflective material such as $TiO_2$ and an emulsion layer 12 are laminated in this order on a support base 10 formed of a paper of substantial thickness. The emulsion layer 12 can be either for a color print or a black-and-white print. Both the resin layer 11 and the emulsion layer 12 are continuously provided on the support base 10 by casting the polyethylene polymer and the emulsion on the support base 10 as it travels in the direction of its length.

In the conventional photographic paper, both the peeling strength between the support base 10 and the resin layer 11 and the peeling strength between the resin layer 11 and the emulsion layer 12 are set to be about 400 gW to prevent the separation of the support base 10 and the emulsion layer 12 from the resin layer 11. Therefore, when the support base 10 is forcibly removed from the photographic paper, a portion of the resin layer 11 and the emulsion layer 12 is also removed with the support base 10 and, accordingly, the image formed on the emulsion layer 12 is damaged.

In the unexposed photographic paper from which the photographic paper of the present invention is produced, the peeling strength between the support base 10 and the resin layer 11 is set within the range of 10 to 200 gW so that the support base 10 can be removed from the photographic paper after an image is formed on the emulsion layer 12 without damaging the image. The pelling strength is measured in a peeling test as defined by D903 of ASTM in which samples of 2.5 cm length are lifted vertically at a rate of 15 cm/min. When the peeling strength is not more than 10 gW, the support base 10 and the resin layer 11 are undesirably separated from each other due to the frictional force effected by rollers or the like during the manufacturing process or developing process of the photographic paper. On the other hand, when the peeling strength is not less than 200 gW, a portion of the resin layer 11 is damaged during the removal of the support base 10. When the peeling strength is set within the range of 10 to 200 gW, the support base 10 and the resin layer 11 are not undesirably separated from each other during the manufacturing process or developing process and, accordingly, the support base can easily be removed only when the photographic paper is attached to the surface to which the photographic paper is intended to be attached. As is disclosed in the aforesaid Japanese Patent Application No. 41078/1977, the aforesaid peel strength range can be accomplished by controlling the casting temperature of the polymer at the time it is cast on the support base 10 to form resin layer 11. Generally, the higher the casting temperature is, the lower is the peeling strength, and vice versa. For example, if the polymer for forming the resin layer 11 is polyethylene, the peeling strength can be set within the aforesaid range by controlling the casting temperature to between 200° C. and 300° C. Also, a release agent layer may be provided on the upper surface of the support base 10 in order to set the peeling strength within the aforesaid range.

The resin layer 11 and the emulsion layer 12 should be in sufficient contact with each other, because the quality of the image is markedly lowered when the resin layer 11 and the emulsion layer 12 separate from each other. Therefore, the peeling strength between the resin layer 11 and the emulsion layer 12 is set to be the same as that of the conventional photographic paper which is more than 200 gW, preferably within the range of 400 to 500 gW. The peeling strength between the resin layer 11 and the emulsion layer 12 may be as low as about 200 gW so long as it is more than twice as large as that between the resin layer 11 and the support base 10. In order to increase the peeling strength between the resin layer 11 and the emulsion layer 12, discharge treatment may be conducted, or a primer layer may be provided therebetween.

The thickness of the resin layer 11 is preferably 10 to 50μ. If it is thinner than 10μ, the resin-emulsion composite will be curled by the shrinkage force of the emulsion layer 12, and this will cause difficulties when the resin-emulsion composite is attached to the surface to which the composite is to be attached after a white adhesive layer is provided on the back surface of the resin layer 11. On the other hand, when the thickness of the resin layer 11 is more than 50μ, the thickness of the whole resin-emulsion composite becomes so large that it becomes useless to provide the removable support base 10. The thickness of the emulsion layer is set to be within the range of 10 to 20μ.

The above-mentioned manufacturing process produces an unexposed photographic paper from which the support base 10 can be removed. An image is printed on the emulsion layer 12 of the unexposed photographic paper by means of a printer, and then the printed image is developed. Thus, the image is formed on the emulsion layer 12 of the photographic paper.

Figure 2:
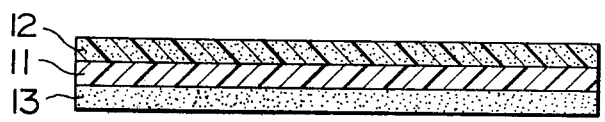
FIG. 2 is a cross-sectional view of a photographic paper in accordance with an embodiment of the present invention.
Figure 3:
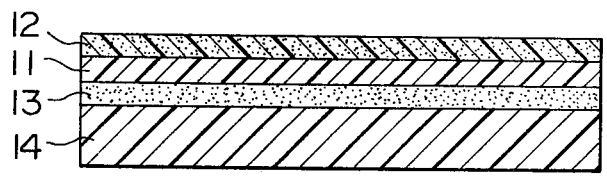
FIG. 3 is a cross-sectional view of a phototgraphic paper in accordance with another embodiment of the present invention.

After the image is formed, the support base 10 is removed from the resin layer 11 of the photographic paper, and then a white adhesive layer 13 is provided on the exposed surface of the resin layer 11 as shown in FIG. 2. The white adhesive layer 13 may be provided by applying a white adhesive in which a white pigment such as titanium dioxide ($TiO_2$), zinc oxide (ZnO), calcium carbonate ($CaCO_3$), calcium sulfate ($CaSO_4$), or the like is dispersed in an ordinary adhesive on the lower surface of the resin layer 11, or may be provided by attaching on the exposed lower surface of the resin layer 11 a previously formed white adhesive layer such as a film member whitened with a white pigment and comprising a base of polyethylene, polypropylene or the like and an adhesive applied on both surfaces thereof. When the aforesaid film member is used as the white adhesive layer 13, the white pigment may be dispersed in the adhesive only, in the base only, or in both the adhesive and the base. Further, as shown in FIG. 3, it is preferable to provide a release paper 14 on the lower surface of the white adhesive layer 13 for convenience of handling and storage. The release paper 14 also has the function of supporting the resin layer 11 and the emulsion 12 after the removal of the support base 10. In attaching the photographic paper to the surface of an object, the release paper 14 is removed from the white adhesive layer 13.

When a conventional photographic paper which has not been exposed is developed, the visual transmission density of the resin-emulsion composite thereof is within a range of from 0.30 to 0.40. Therefore, when an exposed and developed photographic paper for attachment to a desired object is produced by using as an adhesive layer an ordinary unwhitened film member having a visual transmission density ranging 0.02 to 0.20, the visual transmission density of the photographic paper obtained becomes 0.32 to 0.60. Because of this low visual transmission density (high transmittance), the photographic paper becomes translucent and, accordingly, the vividness of the image recorded on the photographic paper becomes low. The inventor of the present invention has investigated the relationship between the visual transmission density of the white adhesive layer and the vividness of the image recorded on the photographic paper by applying to exposed and developed photographic papers various white adhesive layers having different white pigment content and, accordingly, having different visual transmission density on the back surface of the resin layer. As the result of this investigation, it was found that a photographic paper which has an image quality acceptable for practical use is obtained when the visual transmission density of the white adhesive layer is more than 0.4. Especially, when the visual transmission density is more than 0.6, a photographic paper which has an image quality equal to or higher than that of the conventional photographic paper having a visual transmission density of 0.90 to 1.00 can be obtained.

As described above, in the photographic paper for attachment to the surface of a desired object of the present invention, no deterioration of the image quality occurs as a result of application of the photographic paper on the object because it is provided with a white adhesive layer, and accordingly, the photographic paper can provide the object with a good photographic image. Further, the photographic paper to be attached to the surface of a desired object of the present invention has the advantage that the photographic paper can be produced at a low cost. Therefore, the present invention has a great industrial value.

I claim:

1. A photographic element comprising a paper base, a white adhesive layer disposed on the paper base, a resin layer containing a light reflective material disposed on the white adhesive layer, and a photographic emulsion layer on which an image is formed by printing and development disposed on the resin layer.

2. A photographic paper as defined in claim 1 wherein the visual transmission density of said white adhesive layr is more than 0.4.

3. A photographic paper as defined in claim 2 wherein said visual transmission density is more than 0.6.

* * * * *